A. L. DARWIN.
ANIMAL TRAP.
APPLICATION FILED JAN. 11, 1915.
1,208,106.
Patented Dec. 12, 1916.
2 SHEETS—SHEET 1.
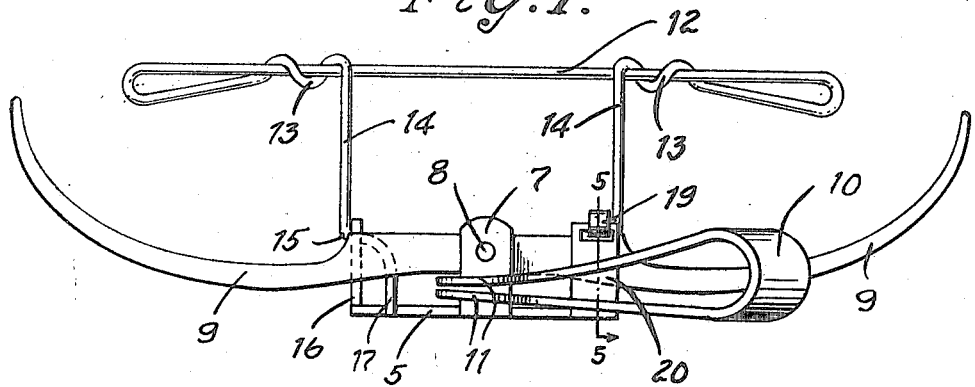
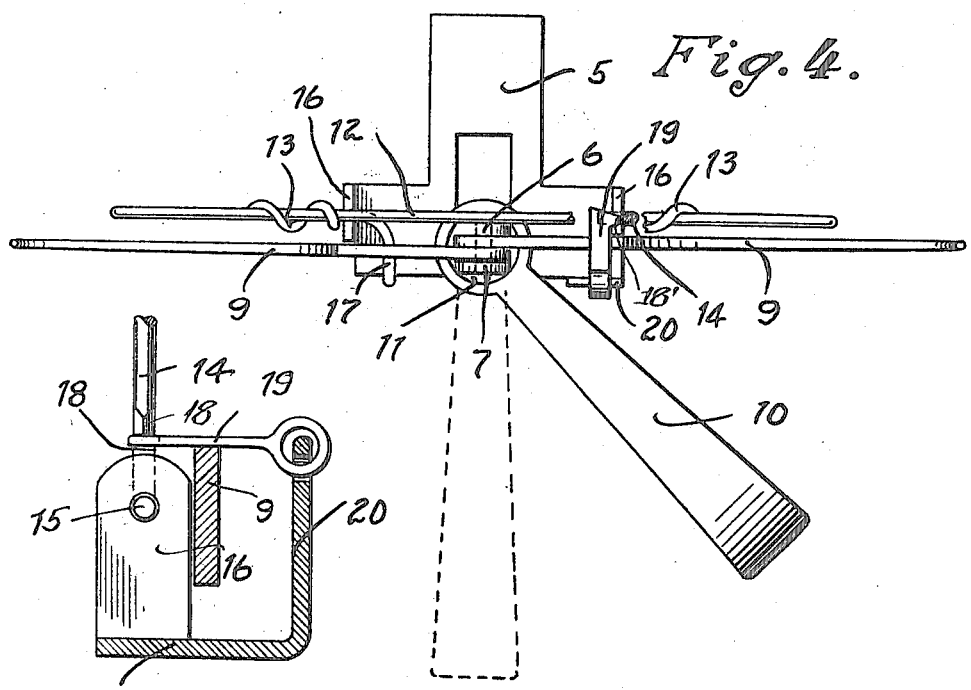
Witnesses
M. S. Watson
C. E. Chandlee
Inventor
A. L. Darwin
By Chandlee & Chandlee
Attorneys

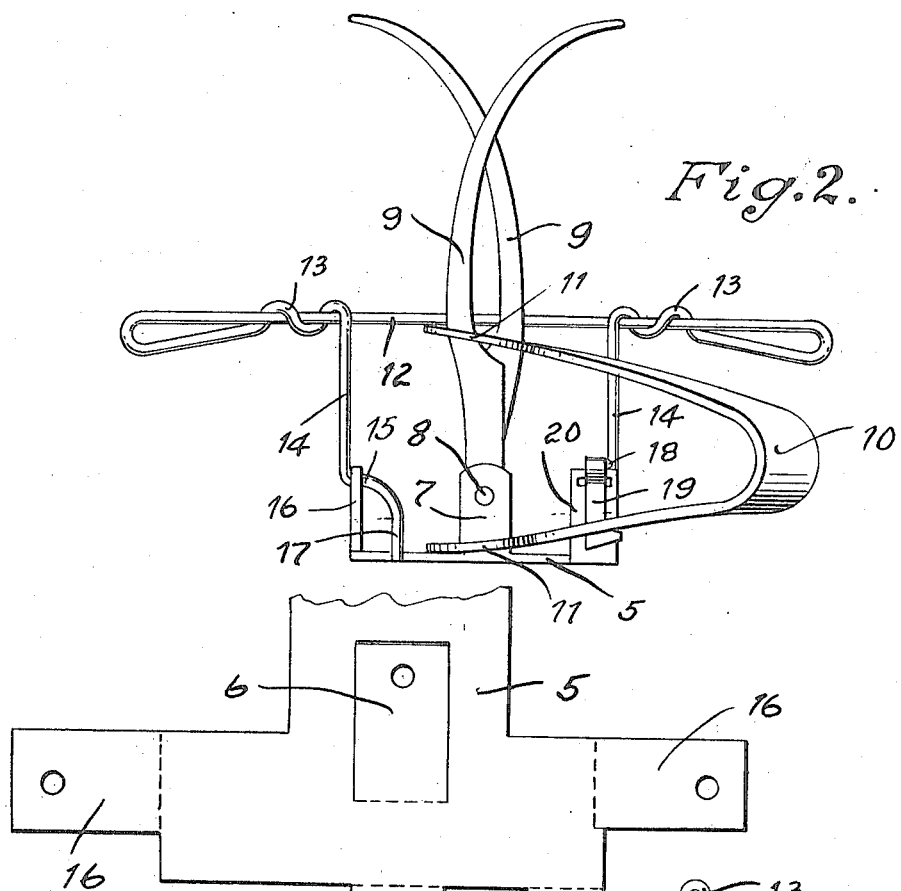
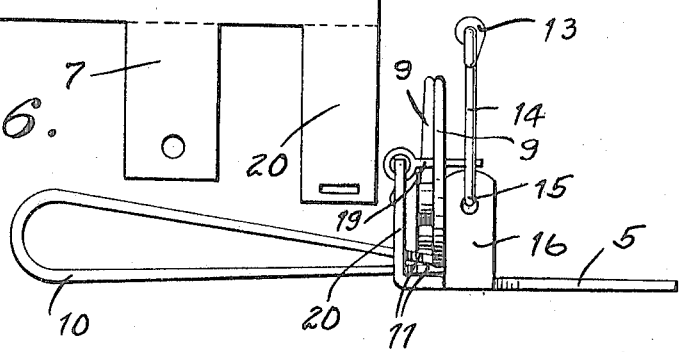

UNITED STATES PATENT OFFICE.

ARTHUR L. DARWIN, OF MAYFLOWER, ARKANSAS.

ANIMAL-TRAP.

1,208,106.  Specification of Letters Patent.  Patented Dec. 12, 1916.

Application filed January 11, 1915. Serial No. 1,649.

*To all whom it may concern:*

Be it known that I, ARTHUR L. DARWIN, a citizen of the United States, residing at Mayflower, in the State of Arkansas, have invented certain new and useful Improvements in Animal-Traps; and I do hereby declare the following to be a full, clear, and exact description of the invention, such as will enable others skilled in the art to which it appertains to make and use the same.

This invention relates to new and useful improvements in animal traps.

The object of the present invention resides in the provision of a trap adapted to be positioned in the runway or path of an animal and to be actuated by the animal striking thereagainst, the trap being so designed that it catches the animal about the body instead of necessarily by one of the legs, thereby obviating the possibility of the animal gnawing his way free from the trap.

A further object of the invention resides in the provision of a trap which is quick and efficient in action and which may be readily and quickly set.

A further object is to provide such a trap with which may be associated a conventional form of actuating spring disposed in such manner that when the trap is completely closed, the spring may assume a normal position of rest so that the life of the spring is prolonged.

A still further object of the invention resides in the provision of a trap of the nature described which comprises a minimum number of parts so arranged that they are durable in use and may be manufactured at a comparatively low cost.

With these and other objects in view, the invention resides in the novel combination, formation and arrangement of parts to be hereinafter described and illustrated in the accompanying drawings and particularly pointed out in the claim hereto appended.

Reference is had to the accompanying drawings wherein similar characters of reference designate corresponding parts throughout the several views, and in which:

Figure 1 is a side view of the trap with its jaws in a set position, Fig. 2 is a similar view of the trap with its jaws released, Fig. 3 is an end view of the trap. Fig. 4 is a top plan view thereof, Fig. 5 is a sectional view on the line 5—5 of Fig. 1, showing the trigger mechanism, and Fig. 6 is a plan view of the blank from which the said plate of the trap is formed.

Referring now more particularly to the accompanying drawings, 5 designates the base plate of the trap which is provided with a tongue 6 struck upwardly adjacent one edge thereof and further provided on said edge with a vertical tongue 7, said tongues being disposed to receive a pivot pin 8 to which and between the tongues are pivoted the inner ends of the jaws 9 of the trap. The spring for the trap comprises the usual U-shaped portion 10 having at the free ends of its arms eyes 11 which, when the trap is set, are disposed about the tongues 6 and 7 and bear against the base plate and against the sides of the jaws.

The member for holding the trigger which holds the jaws in said position comprises a single length 12 of stout wire which has its end portions bent backwardly and coiled about its intermediate portions at 13 and then directed downwardly at 14 and terminating in lateral extensions 15 journaled in lugs 16 bent upwardly from the end edges of the base plate, and rearwardly of the jaws. To prevent this member from swinging forwardly to a position in which it might be caught by the jaws, one of the portions 15 is extended at 17 and adapted to engage against the front edge of the base plate to thus limit the inward swinging movement of the member.

One of the downwardly directed portions 14 is provided in its inner face with a notch 18 with which is adapted to be associated a trigger 19 pivoted to a lug 20 struck upwardly from the front edge of the base plate. The related portion 14 of the trip 12 is disposed directly above the notch 18 and is flattened as at 18' to provide a minimum contacting surface for the trigger whereby an extremely sensitive mechanism will result.

To set the trap, the jaws are swung down upon the base plate, the trigger is swung over the adjacent jaw and the trigger holding member is swung upwardly and the free end of the trigger is engaged in the notch 18. When an animal endeavors to cross the trap, it will strike against the trigger holding member, said member swinging downwardly, to release the trigger and thus allow the jaws to swing together.

From the foregoing it will be observed that an exceedingly simple structure has been provided which will efficiently perform all of the functions normally required thereof.

What is claimed is:

An animal trap comprising a base, a pair of jaws pivoted to the base, spring means for urging said jaws together, a trigger pivoted to the base and adapted to extend across one of the jaws and a trigger holding member comprising a single length of material having its end portions bent back upon its intermediate portions and then directed downwardly and pivoted to the base portion, one of said ends being provided with a notch to receive the free end of the trigger and means preventing the trigger holding member from swinging into the plane of the jaws.

In testimony whereof, I affix my signature, in the presence of two witnesses.

ARTHUR L. DARWIN.

Witnesses:
  T. L. POTTS,
  J. M. McPHERSON.

Copies of this patent may be obtained for five cents each, by addressing the "Commissioner of Patents, Washington, D. C."